United States Patent Office 2,934,530
Patented Apr. 26, 1960

2,934,530

SUSPENSION POLYMERIZATION

Donald E. Ballast, Stanley M. Englund, and Ralph M. Wiley, Midland, Mich., assignors to The Dow Chemical Company, Midland, Mich., a corporation of Delaware No Drawing. Application March 28, 1955
Serial No. 497,450

3 Claims. (Cl. 260—93.5)

This invention concerns a method of suspension polymerization that includes continuously preparing a suspension of droplets of a polymerizable liquid in a thickened non-solvent aqueous liquid medium, which droplets have a substantially uniform and predetermined size and are suitable for polymerization substantially without agitation to form spheroidal globules or beads of polymer.

In an application, Serial Number 497,449, filed concurrently herewith, there is described a method for carrying out suspension polymerizations. According to its method, a polymerizable liquid is dispersed in a non-solvent aqueous medium containing a limited amount of certain water-dispersible, water-insoluble solid colloids, the degree of agitation being effective in causing the formation of droplets smaller than the desired size of the polymer globules, and the solid colloid being one whose particles are adapted to gather in the aqueous medium on the surface of the droplets. In the dispersion so prepared, the total surface area of the droplets of polymerizable liquid is greater than can be completely covered by a layer of the solid colloidal particles. Droplets whose surface is not substantially covered by particles of the solid colloid are not stable to coalescence. The resulting dispersion is then subjected to a condition of quiescence. Under quiescent conditions the droplets undergo a limited coalescence to form a dispersion of a lesser number of larger and substantially uniform sized droplets, such coalescence resulting in a decrease in the total surface area of the droplets. Coalescence of the monomer droplets substantially ceases when the surface thereof becomes substantially covered with the particles of solid colloid that tend to gather at the oil-water interface. The average diameter of the stable droplets is limited substantially in accordance with the general equation $$D = C\frac{dtV}{kw}$$

wherein D is the average diameter of the stabilized oil droplets, V is the volume of the oil in the composition, w is the weight of the solid colloid on a dry basis, d is the dry density of the solid colloid particle, k is the swelling ratio of the colloid particle, i.e., the ratio of the wet volume of the particle in the aqueous dispersion to its dry volume, and t is the thickness of the colloid particle in a direction normal to the surface of the oil droplet when the colloid particle is at the liquid-liquid interface. C is a constant whose value depends on the shape of the solid colloid particle and upon the manner and degree of distribution of the colloid particles on the droplet surface. Depending upon the nature of the particular dispersion, the value of C ranges from about that of $\pi$ to about 6.

The average diameter of the droplets of monomer resulting from limited coalescence of the droplets in the dispersion can be predetermined in the range from about 0.01 or less to about 0.5 centimeter by selection of the composition of the aqueous dispersion in accordance with the above equation. If the values required by the above equation are not known, the invention can be practiced by making a simple preliminary test whereby the relationship between the weight of a given solid colloid, the volume of the polymerizable liquid and the average diameter of the uniform droplets obtained by limited coalescence can readily be determined. In such a test a known volume of polymerizable liquid is vigorously agitated with a known but arbitrarily selected quantity of a solid colloid capable of producing limited coalescence of the dispersed droplets. After such vigorous agitation and after a period of quiescence, the average diameter of the stable droplets resulting from the limited coalescence can be determined. From these data, the weight of such colloid required to prepare droplets of such monomer having a different average diameter can readily be determined since the average diameter of the stable droplets is inversely proportional to the weight of solid colloid, other things being equal. Algebraically, this can be expressed as $$D_1w_1 = D_2w_2 = D_3w_3 \text{ etc.}$$

where the symbols D and w have meanings as before stated.

As described in the afore-mentioned copending application, the uniform-sized droplets of monomer resulting from limited coalescence under quiescent conditions are substantially stable to further coalescence. However, since the density of the monomer oil is usually different from that of the aqueous suspending medium, the droplets usually tend to rise or to settle in the dispersion. In the method described in the afore-mentioned copending application, such congregation is substantially prevented by gently admixing the uniform droplet dispersion resulting from limited coalescence and an agent capable of greatly increasing the apparent viscosity of the aqueous liquid, preferably causing the formation of a thixotropic gel. The resulting thickened dispersion is capable of being handled, e.g., passed through pipes. Agitation is not necessary to maintain the monomer droplet dispersion. The thickened dispersion can be subjected to polymerization conditions substantially without agitation and the uniform-sized droplets of monomer can be polymerized to form uniform-sized spheroidal globules or beads of polymer.

Since the bead size in the method just described is determined principally by the composition of the aqueous dispersion, the mechanical conditions, e.g., the degree of agitation, the size and design of the apparatus used, and the scale of operation, are not highly critical. Furthermore, by employing the same composition, the operations can be repeated, or the scale of operations can be changed, and substantially the same results can be obtained.

However, when the above operations are to be carried out on a large scale, such as in commercial operation, certain difficulties are encountered, particularly in regard to the time required to perform certain steps. For example, during the time that a large quantity of initial dispersion is allowed to rest under quiescent conditions, the droplets of most monomeric liquids whose densities are different from that of the aqueous medium tend to concentrate very closely together while undergoing a limited coalescence. It is difficult to redisperse this mass of droplets to form a uniform dispersion without causing some breaking up of the droplets. Analogously, during the time required to admix a thickener agent with a large quantity of limitedly coalesced dispersion while providing gentle agitation capable of causing thorough blending and uniform dispersion, it is difficult to avoid some breaking up of the droplets.

It is an object of the present invention to provide an improved method which permits carrying out of the above-described operations in a continuous manner.

A specific object is to provide a method of suspension polymerization that includes continuously preparing a suspension of substantially uniform-sized droplets of a polymerizable liquid in a thickened non-solvent aqueous liquid medium.

Another object is to provide such a method wherein the quantity of dispersion undergoing coalescence, the quantity of the resulting dispersion, and the quantity of dispersion undergoing admixing with the thickening agent are each relatively small.

Further objects and advantages of the invention will be evident in the following description.

The objects of this invention are attained in a method which comprises the steps of (1) Feeding to a mixing zone a polymerizable liquid monomer and a non-solvent aqueous suspending medium containing a limited proportion of a water-dispersible solid colloid adapted to gather at the oil-water interface;

(2) Subjecting the resulting mixture to agitation effective in causing the formation of a dispersion of droplets of the polymerizable liquid in the aqueous suspending medium, the size of the droplets being smaller than the size of the desired stabilized droplets;

(3) Conducting the resulting dispersion in non-turbulent flow through a channel to a second mixing zone, the nature of flow through the channel, e.g. its rate, being such that material from the second mixing zone is prevented from flowing back through the channel and such that the monomer droplets undergo limited coalescence during passage through the channel to form a lesser number of droplets of larger and substantially uniform size; and (4) Feeding a thickening agent to the second mixing zone, mildly agitating the resulting mixture to incorporate the thickening agent throughout the same without breaking up the monomer droplets formed by limited coalescence, and passing the thickened mixture to a polymerization zone.

The process can be carried out with any polymerizable liquid material that is not soluble or self-emulsifiable in the aqueous suspending medium and that contains at least one polymerizable organic compound that polymerizes by the mechanism known as addition polymerization. Most polymerizable vinylidene compounds meet these requirements. Examples of typical suitable monomeric compounds that are substantially water-insoluble, polymerizable, and ethylenically unsaturated include alkenyl-aromatic compounds such as the styrene compounds, and alkenylaliphatic compounds such as vinyl and vinylidene chlorides and esters of acrylic and methacrylic acids. Mixtures of two or more polymerizable materials can be used. The polymerizable liquid can also contain non-polymerizable ingredients dissolved or dispersed therein, such as plasticizers and/or preformed polymeric material of a kind that is the same as, or different from, the monomeric ingredient, provided that the resulting mixture exhibits liquid behavior and is not soluble or self-emulsifiable in the aqueous suspending medium and provided that the monomeric ingredient is polymerizable in the mixture. Monomer-soluble, water-insoluble catalysts, such as benzoyl peroxide, can be employed to activate the polymerization and are preferably dispersed in the monomer liquid starting material prior to its dispersion in the aqueous suspending medium.

The aqueous suspending medium is one comprising water and at least the first or the following ingredients:

(1) A water-dispersible but water-insoluble solid colloid the particles of which in aqueous dispersion have dimensions in the order of from about 0.1 to about 50 microns, i.e., from about $10^{-5}$ to about $5 \times 10^{-3}$ centimeters, which particles tend to gather at the liquid-liquid interface or are caused to do so by the presence of (2) A water-soluble "promoter" that affects the "hydrophilic-hydrophobic balance" or the solid colloid particles; and/or (3) An electrolyte; and/or (4) Colloid-active modifiers such as peptizing agents, surface-active agents and the like; and, usually, (5) A water-soluble, monomer-insoluble inhibitor of polymerization.

The water-dispersible, water-insoluble solid colloids can be inorganic metal salts, oxides, hydroxides or clays, or can be organic materials such as raw starches, sulfonated crosslinked organic high polymers, resinous polymers and the like. In the aqueous dispersion the particles of the solid colloid must retain a relatively rigid and discrete shape and size within the limits stated. Materials that disperse in water to form true or colloidal solutions in which the particles have a size below the range stated or in which the particles are so diffuse as to lack a discrete shape and size are not suitable as agents for producing stable droplets by limited coalescence.

It is essential that the solid colloid particles tend to gather within the aqueous liquid on the surface of the monomer droplets. In some instances, it is desirable to add a "promoter" material to the aqueous composition to drive the solid colloid to the liquid-liquid interface. This phenomenon is well known in the emulsion art, and is here applied to solid colloidal particles, as a means of adjusting the "hydrophilic-hydrophobic balance." Usually, the promoters are organic materials that have an affinity for the solid colloid and also for the monomer droplets and that are capable of making the solid colloid more oleophilic. For example, positively charged complex metal salts or hydroxides, such as aluminum hydroxide, can be promoted by the presence of negatively charged organic promoters such as water-soluble sulfonated polystyrenes, alginates and carboxymethylcellulose. Negatively charged colloids, such as bentonite clay, are promoted by positively charged promoters such as tetramethyl ammonium hydroxide or chloride, or water-soluble complex resinous amine condensation products such as the water-soluble condensation products of diethanolamine and adipic acid, the water-soluble resinous condensation products of ethylene oxide, urea and formaldehyde, and polyethylenimine. Amphoteric materials such as proteinaceous materials like gelatin glue, casein, albumin and glutin are effective promoters for a wide variety of colloidal solids. Non-ionic materials such as methoxycellulose are also sometimes effective. Usually, the promoter need be employed only to the extent of a few parts per million of aqueous medium. In some instances, ionic materials normally classed as emulsifiers, such as the soaps, the long chain sulfates and sulfonates and the long chain quaternary ammonium compounds, can also be used as promoters for the solid colloids, but care must be taken to avoid thereby causing the formation of stable colloidal emulsions of the polymerizable liquid and the aqueous liquid medium. An effect similar to that of organic promoters is sometimes obtained with small amounts of inorganic electrolytes, e.g., water-soluble, ionizable alkalies, acids and salts, especially those that have polyvalent ions.

The solid colloid particles so-modified by action of the promoters tend to gather on the surface of the monomer droplets where they function as protective agents in the phenomenon of limited coalescence. Other agents that can be employed in known manner to effect modification of the colloidal properties of the solid colloids are those materials known in the art as peptizing agents, flocculating and deflocculating agents, sensitizers, surface active agents and the like.

It is sometimes desirable to add to the aqueous medium a few parts per million of a water-soluble, monomer-insoluble inhibitor of polymerization effective to prevent the polymerization of monomer molecules that might diffuse into the aqueous liquid and that, if allowed to polymerize in the aqueous phase, would tend to make emulsion-type polymer dispersions instead of, or in addition to, the desired bead or pearl polymers.

In practice of the present invention, an aqueous composition of the kind just described and a polymerizable monomer liquid insoluble therein and of a kind as hereinbefore described are fed to a first mixing zone in relative proportions corresponding to at least 0.5 part, usually from about 1 to about 10 or more parts, by volume of aqueous suspending medium per part by volume of monomer liquid. The composition and proportion of aqueous medium are also selected to contain the equivalent of from about 0.01 to about 10 or more grams of the solid colloid per 100 cubic centimeters of the polymerizable liquid depending on the desired size of the stabilized droplets in accordance with the equation hereinbefore given.

In this first zone, the mixture is subjected to conditions effective to cause the formation of small droplets of the polymerizable liquid and the dispersion thereof in the suspending medium and to cause the solid colloid to gather on the surface of the monomer droplets. Preferably this is accomplished by mechanical agitation and can be carried out in a variety of ways in conventional manner. This zone can comprise several regions. For example, a large batch of a mixture of aqueous medium and monomer liquid can be prepared and subjected to agitation sufficient to cause a preliminary dispersion of the monomer liquid but not sufficient to accomplish the desired objects and then a stream of such dispersion can be passed in a continuous manner through a smaller region and there be subjected to intense agitation conditions of a kind and for a time sufficient to effect the desired dispersion. The starting liquids, i.e., the polymerizable liquid and the aqueous composition, can be fed in continuous or intermittant manner to the first mixing and preliminary dispersion zone just described. Alternatively, separate streams of the polymerizable monomer and of the aqueous suspending medium containing the solid colloid are fed continuously in desired proportions directly to the zone of intense dispersion.

The monomer droplets produced by this operation should be no larger, and preferably should be much smaller, than the stable droplets expected and desired in the dispersion obtained by subsequent limited coalescence.

From the zone just described the resulting dispersion is caused to flow through a channel to a second dispersing zone. Passage of the dispersion through this channel is intended to accomplish two principal results, namely, (1) To permit a limited coalescence of the unstable droplets and the formation of a lesser number of larger and substantially uniform sized droplets substantially stabilized as to further coalescence by the presence of the solid colloid, and (2) To prevent the back-flow of material from the second dispersing zone to the first dispersing zone.

Accordingly, the rate of flow of the dispersion through the channel is made fast enough to prevent any back-flow, either by gravity or by diffusion, of any material from the second dispersing zone toward the first dispersing zone. At the same time, the rate of flow and the physical characteristics thereof are made such that a condition of relative quiescence prevails whereby the droplets undergo a limited coalescence during passage through the channel. This condition is obtained by a non-turbulent flow of the dispersion through the channel and by operating in such a manner as to avoid subjecting the droplets to shearing forces that would tend to fragment the droplets. To this end the inside of the channel in contact with the dispersion is preferably straight or gradually curved (avoiding abrupt turns), smooth-walled, and substantially free of surface or configurational irregularities or discontinuities. Preferably, the internal surface of the channel in contact with the dispersion should be relatively non-wettable by the polymerizable liquid and preferentially wettable by the aqueous suspending medium. The length of the channel and its cross-section must be such that, at the rate of flow therethrough, the time required for passage of an incremental portion of the dispersion from the first to the second dispersing zone is at least that time required for the droplets of polymerizable liquid substantially to complete a limited coalescence and to form a lesser number of larger and uniform-sized droplets that are substantially stable to further coalescence. Preferably, the operation is carried out so that the limited coalescence is substantially complete in the first half of the transit of the channel. The average time of residence of the dispersion in this channel is generally not more than a few minutes, e.g. up to about 5 minutes, and is usually from about ¼ to about 1 minute.

Two or more parallel channels of the kind described can be employed between the first and second dispersing zones if necessary or desirable.

The dispersion is caused to flow from the channel just described into a second dispersing zone into which is also fed a material effective in causing an increase in the apparent viscosity of the dispersion. The relative rates of flow of the dispersion from the coalescence channel and of the thickening agent are such that the composition resulting from thorough blending thereof is of such a nature that the suspended droplets are substantially prevented from moving relative to the suspending medium due to the difference in densities thereof. Preferably the suspending medium is made a thixotropic gel wherein the stress exerted on the surrounding medium by a suspended droplet is not sufficient to cause movement of the droplet through that medium. The apparent viscosity of suitably thickened suspensions is usually in the order of at least 500 centipoises, e.g., as measured with a Brookfield viscosimeter using a Number 2 spindle at 30 r.p.m.

Examples of suitable such thickening agents are sulfonated polystyrenes (water-dispersible, thickening grade), hydrophilic clays such as bentonite, digested starch, natural gums, carboxy-substituted cellulose ethers and the like. Usually, the thickener agent is first dispersed in an aqueous concentrated feed material and such concentrated feed material is then fed to the second dispersing zone.

To the second dispersing zone can also be fed other agents if such are necessary or desirable. For example, it is sometimes advantageous to feed to the second dispersing zone a solution of an electrolyte effective in causing gelation of the thickener. A water-soluble inhibitor of polymerization or a water-solution thereof can also be fed to this second dispersing zone if such inhibitor was not fed into the first dispersing zone.

The various materials that are fed into the second dispersing zone are therein gently but thoroughly blended together by subjecting the mixture to mild mechanical agitation without breaking up the droplets of polymerizable liquid formed by the limited coalescence. The average time of residence of the material in the second dispersing zone need be only enough to insure thorough and uniform mixing of the ingredients, generally up to about 5 minutes and usually from about ½ to 2 minutes.

The resulting thickened dispersion of polymerizable liquid in an aqueous suspending medium is then passed from the second dispersing zone into a polymerization zone wherein the dispersion is subjected in a known manner to conditions conducive to polymerization of the polymerizable liquid. The thickened dispersion is capable of being handled, e.g., passed through pipes, and can be subjected to polymerization conditions substantially without mechanical change in the size or shape of the dispersed oil droplets.

The process is particularly well suited for use in continuous polymerization procedures that can be carried out in coils, tubes and elongated vessels adapted for continuously introducing the thickened dispersions into one end and for continuously withdrawing the mass of polymer beads from the other end. The polymerization step can also be practiced in batch manner.

Suspension polymerization of water-insoluble polymerizable ethylenically unsaturated vinylidene compounds in thickened aqueous media is the subject of copending applications, Serial Numbers 451,681, 451,682, 451,683, and 451,684, all filed August 23, 1954.

Polymerization of the polymerizable liquid contained in the uniform-sized droplets dispersed in the thickened aqueous suspending medium as just described is usually effected by raising the temperature of the dispersion until polymerization of the polymerizable material is initiated and by maintaining those conditions until the polymerization is substantially complete. No agitation is required to maintain the polymerizing oil droplets in dispersed condition or to prevent their settling or rising in the suspending medium, although gentle agitation can be employed to assist in heat transfer. Because the droplets are held apart from one another during the polymerization without being subjected to mechanical stresses, the droplets retain their spheroidal shape. The resulting polymer beads are also nicely spheroidal, often almost perfectly spherical, and are substantially free of misshapen beads such as are often obtained when agitation is employed during polymerization. The beads are also free of adhesion to one another such as is often obtained in methods wherein the polymerizing droplets are allowed to pack too closely together.

After the polymerization is substantially complete, the polymer beads can be collected, separated from the suspending medium, washed and otherwise treated in ways already known in this art.

The following examples illustrate ways in which the invention has been practiced, but should not be construed as limiting its scope.

EXAMPLE 1

A laboratory apparatus was arranged and operated to carry out the present continuous method. The apparatus was divided into several fundamental zones as follows:

*The first dispersing zone.*—This zone comprised a vertically elongated cylindrical vessel made from a 1-inch by 8-inch glass test-tube fitted with a very high-speed axial stirrer. The polymerizable monomer liquid was pumped continuously into this vessel near its bottom while a dilute solid colloid suspension in water was fed continuously into the same vessel just above the point of entry of the polymerizable liquid, the two feeds being at rates corresponding to the desired relative proportions of solid colloid to polymerizable liquid. The polymerizable liquid was thoroughly dispersed as fine droplets into the aqueous suspending medium by the action of the stirrer. The resulting dispersion flowed out of the first dispersing zone into a quiescent zone.

The quiescent zone was a 3-mm.-diameter by 4-inch-long glass transfer tube leading from the first dispersing zone to a second dispersing zone. In the quiescent zone there was no agitation and only slow, non-turbulent flow. In this zone, the small droplet dispersion from the first dispersing zone underwent a limited coalescence which was usually complete in about 15 seconds of residence time during which the dispersion traveled about 1.5 inches through the transfer tube. The size to which the droplets grew during the transit of the quiescent zone was determined solely by the composition of the suspending medium, e.g., the kind and amount of the solid colloid relative to the polymerizable liquid. The speed or design of the agitator in the first dispersion zone was not critical provided that the size of the oil droplets produced by such agitation was less than the size capable of being stabilized by the solid colloid. Nor was the size and design of the quiescent zone vessel critical provided that adequate time of residence of the dispersion was allowed therein to permit limited coalescence to occur.

It was also desirable that the tube defining the zone of limited coalescence be smooth walled internally and free of anything that would give turbulence to the dispersion or otherwise cause shearing of the oil droplets. The limitedly coalesced dispersion passed from the quiescent zone to the second dispersing zone.

The second dispersing zone was another vertically elongated cylindrical vessel made from a 1-inch by 4-inch test-tube into the bottom of which flowed the limitedly coalesced dispersion from the quiescent zone. Also into this vessel near its bottom was continuously passed a water solution of a polyvalent ion salt, if one were used, and still further up the vessel there was continuously pumped in an aqueous concentrated thickener composition. A rotating paddle in this vessel provided a gentle blending action thoroughly to mix the dispersion without turbulence and without subdividing the dispersed droplets of polymerizable liquid. The resulting thickened dispersion flowed from the second dispersing zone into the polymerization zone.

The polymerization zone was contained in a vertically disposed, jacketed tube 1.5 inches in diameter by about 8 feet long in two sections in series. The thickened dispersion from the second dispersing zone flowed into the top of the first and longer of these sections thence therethrough to the bottom of the second and shorter section, thus reversing the direction of its flow from downward in the first section to upward in the second section. The temperature in the polymerization zone was maintained in the desired range by means of a heat-transfer fluid circulated through the jacket about the tubes. The dispersion flowed from the polymerization zone to a collector for the polymer beads.

Styrene was polymerized in the apparatus just described using a dilute bentonite clay as the solid colloid in the first dispersion and a more concentrated bentonite clay as the thickener in the second dispersing zone.

The aqueous suspension medium employed to obtain limited coalescence of the monomer liquid consisted of water containing 0.012 percent by weight of bentonite, 0.012 percent by weight of a promoter that was a water-soluble condensation product of equimolar proportions of diethanolamine and adipic acid and 0.009 percent by weight of another promoter that was a water-soluble condensation product of ethylene oxide, urea and formaldehyde. This aqueous liquid mixture was pumped into the first dispersing zone at an average rate of 28.3 ccs. per hour together with liquid monomeric styrene containing 0.5 percent by weight benzoyl peroxide at an average rate of 28.3 ccs. per hour.

The dispersion obtained in the first dispersing zone flowed through the transfer tube, in which a limited coalescence of the dispersed oil droplets occurred with formation of a lesser number of larger and very uniform-sized droplets of styrene monomer, to the second dispersing zone.

To the dispersion entering the second dispersing zone was added a water solution containing one percent by weight of cupric sulfate pentahydrate fed at an average rate of 10.8 ccs. per hour and a four percent by weight suspension of bentonite clay in water fed at an average rate of 40.1 ccs. per hour. The separate feed streams were thoroughly but gently blended in the second dispersing zone to avoid subdividing the droplets of styrene liquid but to form a dispersion of those droplets in the aqueous liquid medium the viscosity of which increased as the bentonite clay dispersion gelled.

The thixotropic suspension of styrene monomer droplets in the gelled clay aqueous suspension flowed from the second dispersing zone to and through the polymerization zone where the temperature was maintained at about 85° C. and wherein the styrene in the droplets polymerized to form polystyrene in the form of beads.

The polystyrene beads resulting from carrying out the above operations for a period of several hours were collected, separated from the aqueous suspending medium, washed with water and dried. The resulting beads were graded on standard wire screens with the results shown in Table I.

*Table I*

| Screen (Square Mesh, Wire) | | Beads Retained, Percent by Weight |
|---|---|---|
| U.S. Bureau of Standards No. | Screen Opening in Inches, Approximately | |
| 6 | 0.132 | 1.8 |
| 12 | 0.0661 | 3.6 |
| 20 | 0.0331 | 8.9 |
| 50 | 0.0117 | 85.7 |
| | | 100.0 |

EXAMPLE 2

The apparatus and procedure described in Example 1 were employed to polymerize a mixture of styrene and divinylbenzene to make crosslinked polymer beads suitable for use in making ion exchange resins in bead form.

The monomer liquid contained styrene, 8 percent by weight divinyl benzene and 0.3 percent by weight benzoyl peroxide. This was fed to the first dispersing zone at an average rate of 105.1 ccs. per hour. The aqueous suspending medium was water containing 0.01 percent by weight of bentonite clay, 0.01 percent by weight of a water-soluble condensation product of equimolar proportions ow diethanolamine and adipic acid and 0.009 percent by weight of a water-soluble condensation product of ethylene oxide, urea and formaldehyde. This aqueous medium was fed to the first dispersing zone at an average rate of 105.1 ccs. per hour.

A solution of one percent by weight of cupric sulfate pentahydrate in water was fed to the second dispersing zone at an average rate of 38.7 ccs. per hour.

A thickener suspension of 4 percent by weight of bentonite clay in water was fed to the second dispersing zone at an average rate of 147.2 ccs. per hour.

The thickened, gelled clay suspension of uniform-sized droplets of liquid monomeric material was passed through the polymerization zone held at temperatures about 85° C. whereby the monomeric liquid was converted to polymer in the form of beads.

The resulting polymer beads were collected, separated from the aqueous liquid suspending medium, washed with water and dried. The beads were then graded on standard wire screens with the results shown in Table II.

*Table II*

| Screen (Square Mesh, Wire) | | Beads Retained, Percent by Weight |
|---|---|---|
| U.S. Bureau of Standards No. | Screen Opening in Inches, Approx. | |
| 6 | 0.132 | None |
| 12 | 0.0661 | Trace |
| 16 | 0.0469 | Trace |
| 20 | 0.0331 | 10.3 |
| 30 | 0.0232 | 87.6 |
| 40 | 0.0165 | 2.1 |
| 50 | 0.0117 | Trace |
| | | 100 |

For contrast, beads were obtained that had been made by suspension polymerization of the same kind of monomer composition using controlled agitation in an aqueous suspending medium containing methoxy cellulose as the granulating agent, where the object had been to produce beads passing the No. 20 screen but not passing the No. 30 screen. Only 57 percent of the beads were in this size range in contrast to the 87.6 percent in the product made by the present improved process. Furthermore, photomicrographs of the beads made by the present method showed that most of the beads were almost perfectly spherical. Very few of the beads were misshapen and very few had any surface imperfections.

EXAMPLE 3

Another apparatus, modeled after that described in Example 1 but larger in size, was constructed principally from stainless steel. The first dispersing chamber was a cylinder about 2 inches in diameter and about 20 inches long containing a high-speed mechanical stirrer.

Connecting the first dispersing chamber with a second dispersing chamber was a transfer tube ⅜ inch in diameter by 15 inches long. Inserted in this tube as a part thereof was a sight-glass section 4 inches long and of the same diameter as the remainder of the tube which was stainless steel coated on its inside surface with a glossy-surfaced, baked-on layer of a phenol-formaldehyde resin material. Bare stainless steel, even though smooth and shiny, was not entirely satisfactory for the transfer tube and it was found that its surface was readily wetted by the monomer droplets passing through the tube. The resin-coated tube was not readily wetted by the monomer droplets and was very satisfactory.

The second dispersing chamber was a cylinder about 3 inches in diameter by about 10 inches long containing a slow-moving paddle stirrer.

To the first dispersing chamber was fed a mixture of styrene and 0.08 percent by weight divinylbenzene and 0.5 percent by weight benzoyl peroxide as catalyst, the average rate of feed being 2524 ccs. per hour, corresponding to about 5 pounds per hour. Also fed to the first dispersing chamber at an average rate of 2524 ccs. per hour was an aqueous mixture of water and 0.0085 percent by weight of bentonite clay as the solid colloid promoted by the presence of 0.0076 percent of a water-soluble condensation product of equimolar proportions of diethanolamine and adipic acid and 0.0076 percent of a water-soluble condensation product of ethylene oxide, urea and formaldehyde, all based on the weight of the water.

The dispersion resulting in the first dispersing chamber flowed therefrom through the transfer tube, wherein a limited coalescence of the monomer droplets occurred with the formation of a lesser number of larger and substantially uniform-sized, stable droplets, to the second dispersing chamber.

To the second dispersing chamber there was also fed a solution of 1 percent by weight of cupric sulfate pentahydrate in water, at an average rate of about 500 ccs. per hour, and a dispersion of 4 percent by weight of bentonite clay in water, at an average rate of about 2500 ccs. per hour.

In the second dispersing chamber, the several feed streams were gently but thoroughly blended to form a thixotropic gel. The gel suspension was heated at temperatures about 70° C. without agitation until polymerization of the monomers in the droplets was substantially complete.

The beads of polymer were collected, separated from the suspending medium, washed, dried and subjected to a standard sieve analysis, the results of which were as follows.

| U.S. Screen Size | Weight Percent Retained |
|---|---|
| larger than 14 mesh | none |
| 14 | 0.9 |
| 18 | 77.7 |
| 20 | 14.3 |
| smaller than 20 | 7.1 |

The weight average size of the beads was 1.05 mm.

EXAMPLE 4

Another apparatus, similar to that described in Example 3 but larger by a factor of about ten, was constructed. The first disperser was about 6 inches in diameter by about 2 feet long and contained a high-speed, high-shear agitator. The second disperser was about 6 inches in diameter by about 6 inches long and contained a slow-moving paddle stirrer. The transfer tube or channel between the first and second dispersers was about one inch in inside diameter by about 15 inches long and was made of stainless steel lined on the inside with a glossy coating of a fused phenol-formaldehyde resin material that was relatively non-wettable by monomeric styrene but preferentially wettable by the aqueous suspending medium.

Materials having the compositions shown in Example 3 were fed into this apparatus in a manner described in that example. The monomer composition was fed at an average rate of 61.0 pounds per hour, the other feed materials being fed at proportionate rates. The resulting thickened dispersion of droplets of monomeric liquid was heated without agitation at polymerization conditions until polymerization of the monomer was substantially complete.

The beads of polymer were collected, separated from the suspending medium, washed, dried and subjected to a standard sieve analysis, the results of which were as follows for two separate trials.

| U.S. Screen Size | Weight Percent Retained | |
|---|---|---|
| | Sample A | Sample B |
| larger than 18 mesh | 2.8 | 12.3 |
| 18 | 62.0 | 60.1 |
| 20 | 19.2 | 13.4 |
| smaller than 20 | 16.0 | 14.2 |

The weight average size of the beads was 1.006 and 1.043 mms., respectively, for the two samples.

It is to be understood that the practice of the invention is not confined to any particular apparatus but resides in a method particularly pointed out and distinctly claimed as follows.

We claim:

1. In a process of making solid polymeric bodies in the form of spheroidal globules having substantially uniform size by forming a suspension of small droplets of a polymerizable liquid comprising styrene in an aqueous non-solvent liquid medium, the apparent viscosity of the aqueous suspending medium being such that movement of the dispersed droplets relative to the surrounding medium by action of gravitational force due to difference in density between the droplets and the surrounding medium is substantially prevented, and polymerizing the polymerizable liquid in such suspension by subjecting the same to conditions conducive to polymerization without turbulence whereby the suspended droplets of polymerizable liquid are converted to globules of polymer having approximately the same size and shape as those of the suspended droplets, the improvement that comprises making a suspension of droplets of a polymerizable liquid comprising styrene in an aqueous non-solvent medium by forming in a first mixing zone a mixture that comprises one part by volume of a polymerizable organic liquid comprising styrene and at least 0.5 part by volume of an aqueous non-solvent liquid medium which comprises a water-insoluble, hydrophilic, colloidal solid particle emulsifier capable of stabilizing an oil-in-water suspension, the colloidal solid particle emulsifier being a hydrous mineral oxide present in amount corresponding to from 0.01 to 10 grams per 100 cubic centimeters of the polymerizable liquid, mechanically agitating the mixture to disperse the polymerizable liquid, as smaller-than-stable droplets, in the non-solvent liquid medium, continuously passing a stream of the resulting dispersion in non-turbulent flow from the first mixing zone to a second mixing zone through a channel, the nature of the flow through such channel being such that material from the second mixing zone is prevented from flowing back through the channel and such that the dispersed droplets undergo limited coalescence during passage through the channel to form a lesser number of droplets of larger and substantially uniform size and that are substantially stable to further coalescence, continuously feeding to the second mixing zone a water-dispersible thickening agent, and mildly agitating the resulting mixture to incorporate the thickening agent throughout the same without breaking up the droplets of polymerizable liquid formed by the limited coalescence.

2. The improvement according to claim 1 wherein the hydrous mineral oxide solid particle emulsifier is a bentonite clay.

3. The improvement according to claim 1 wherein the hydrous mineral oxide solid particle emulsifier is a bentonite clay and the water-dispersible thickening agent is a water-thickening grade of bentonite clay.

References Cited in the file of this patent

UNITED STATES PATENTS 2,701,245    Lynn _____ Feb. 1, 1955

OTHER REFERENCES

Schildknecht: "Polymer Processes," pages 72–81 (1946).